US012719812B2

(12) United States Patent
Shao

(10) Patent No.: US 12,719,812 B2
(45) Date of Patent: Aug. 25, 2026

(54) METHODS AND SYSTEMS FOR DYNAMIC COMPUTING RESOURCE ALLOCATION BASED ON IIOT DATA CENTER

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/208,724

(22) Filed: May 15, 2025

(65) Prior Publication Data

US 2025/0274401 A1 Aug. 28, 2025

(30) Foreign Application Priority Data

Mar. 24, 2025 (CN) ........................ 202510349630.8

(51) Int. Cl.
*H04L 47/76* (2022.01)
*G16Y 30/00* (2020.01)

(52) U.S. Cl.
CPC .............. *H04L 47/76* (2013.01); *G16Y 30/00* (2020.01)

(58) Field of Classification Search
CPC ................. G06F 9/5027; G06F 9/4881; G06F 2209/5017; G06F 9/5066; G06F 9/48;
(Continued)

(56) References Cited

U.S. PATENT DOCUMENTS 9,497,112 B2 * 11/2016 Guo ...................... G06F 9/5077
10,225,206 B2 * 3/2019 Amulothu .............. H04L 47/70
(Continued)

FOREIGN PATENT DOCUMENTS

CN 114205249 A 3/2022
CN 117149441 B * 1/2024 ........... G06F 9/5038
(Continued)

OTHER PUBLICATIONS

First Office Action in Chinese Application No. 202510349630.8 mailed on Jun. 30, 2025, 12 pages.
(Continued)

*Primary Examiner* — Alex Tran
(74) *Attorney, Agent, or Firm* — PORUS IP LLC

(57) ABSTRACT

Embodiments of the present disclosure provide a method for dynamic computing resource allocation based on an IIoT data center, the method comprising: receiving, via an IIoT user platform 110, a business demand of an enterprise user, and sending the business demand via an IIoT service platform 120 to a data computing center of a IIoT management platform 130; monitoring, by a monitoring module, resource data of a business management sub-platform; determining, based on the business demand, a resource demand feature of the enterprise user; determining, based on the resource demand feature and the resource data of the business management sub-platform, a resource allocation parameter; and, generating, via the control center, a resource allocation instruction based on the resource allocation parameter.

8 Claims, 4 Drawing Sheets

(58) Field of Classification Search
CPC ........ G06F 9/50; G06F 9/5005; G06F 9/5038; G06F 9/5044; G06F 9/505; G06F 9/5061; G06F 9/5077
See application file for complete search history.

(56) References Cited

U.S. PATENT DOCUMENTS

| | | | | |
|---|---|---|---|---|
| 11,954,112 | B2 * | 4/2024 | Siebel | G06F 8/10 |
| 12,210,329 | B2 * | 1/2025 | Amaro, Jr. | G06F 9/45558 |
| 2024/0069969 | A1 * | 2/2024 | Mukundan | G06F 9/5044 |

FOREIGN PATENT DOCUMENTS

| | | | | | |
|---|---|---|---|---|---|
| CN | 117834560 | A | | 4/2024 | |
| CN | 118760505 | A | * | 10/2024 | G06N 20/00 |
| CN | 119420755 | A | | 2/2025 | |
| WO | WO-2024125251 | A1 | * | 6/2024 | G06F 9/5005 |
| WO | WO-2024187479 | A1 | * | 9/2024 | G06F 9/4887 |
| WO | WO-2025160415 | A1 | * | 7/2025 | G06N 20/00 |

OTHER PUBLICATIONS

Notification to Grant Patent Right for Invention in Chinese Application No. 202510349630.8 mailed on Jul. 10, 2025, 4 pages.
First Office Action in Chinese Application No. 202510349630.8 malled on Jun. 30, 2025, 10 pages.

* cited by examiner

METHODS AND SYSTEMS FOR DYNAMIC COMPUTING RESOURCE ALLOCATION BASED ON IIOT DATA CENTER

CROSS-REFERENCE TO RELATED APPLICATIONS

This application claims priority to Chinese Patent Application No. 202510349630.8, filed on Mar. 24, 2025, the contents of which are incorporated herein by reference.

TECHNICAL FIELD

The present disclosure relates to the field of data processing, and in particular, relates to a method and a system for dynamic computing resource allocation based on an industrial Internet of Things data center.

BACKGROUND

With the advent of the Industry 4.0 era, the Industrial Internet of Things (IIoT) has become a core driver of the intelligent transformation of manufacturing. In a production line based on IIoT, numerous sensors, smart devices, and control systems are connected with each other to build a highly integrated, data-driven production environment. In such an environment, the efficient operation of the production line relies on a real-time processing and analysis of large amounts of data, as well as the precise allocation of computing resource. However, in the face of huge differences in different business demands, how to dynamically allocate computing resource for IIoT platforms under the limited computing resource in a data center has become an important challenge for industrial production.

Based on this, the present disclosure provides a system and a method for dynamic computing resource allocation based on an industrial Internet of Things data center to dynamically allocate computing resource for different sub-platforms to optimize the execution of computing tasks to ensure stable operation and efficient scheduling of production lines.

SUMMARY

One or more embodiments of the present disclosure provide a system for dynamic computing resource allocation based on an IIoT data center, the system comprises an IIoT user platform, an IIoT service platform, an IIoT management platform, an IIoT sensing network platform, and an IIoT sensing control platform; the IIoT user platform is configured to receive a business demand from an enterprise user and send the business demand to a data computing center of the IIoT management platform via the IIoT service platform; the IIoT management platform comprises the data computing center, a business management sub-platform, and a control center; the business management sub-platform includes a monitoring module, the monitoring module is configured to monitor resource data of the business management sub-platform; the control center is configured to: determine are source demand feature of the enterprise user based on the business demand; determine a resource allocation parameter based on the resource demand feature and the resource data of the business management sub-platform, the resource allocation parameter including computing resource corresponding to a computing task; the control center is further configured to generate a resource allocation instruction based on the resource allocation parameter; the resource allocation instruction is configured to: create a process corresponding to the computing task; bind the process corresponding to the computing task to a resource core corresponding to the computing task, the resource core being determined based on the resource allocation parameter.

One or more embodiments of the present disclosure provide a method for dynamic computing resource allocation based on an IIoT data center, the method is performed by a control center of an IIoT management platform of a system for dynamic computing resource allocation based on an IIoT data center, the system comprises an IIoT user platform, an IIoT service platform, the IIoT management platform, an IIoT sensing network platform, and an IIoT sensing control platform; the IIoT management platform comprises a data computing center, a business management sub-platform, and the control center; the business management sub-platform comprises a monitoring module; the method comprises: receiving, via the IIoT user platform, a business demand of an enterprise user and sending, via the IIoT service platform, the business demand to a data computing center of the IIoT management platform; monitoring, by the monitoring module, resource data of the business management sub-platform; determining a resource demand feature of the enterprise user based on the business demand; based on the resource demand feature and the resource data of the business management sub-platform, determining a resource allocation parameter, the resource allocation parameter including computing resource corresponding to a computing task; generating, by the control center, a resource allocation instruction based on the resource allocation parameter; the resource allocation instruction is configured to: create a process corresponding to the computing task; bind the process corresponding to the computing task to a resource core corresponding to the computing task, and the resource core is determined based on the resource allocation parameter.

One or more embodiments of the present disclosure provide a non-transitory computer-readable storage medium, the storage medium storing computer instructions, and when the computer reads the computer instructions in the storage medium, the computer executes a method for dynamic computing resource allocation based on an IIoT data center.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numerals represent the same structures, wherein.

DETAILED DESCRIPTION

Figure 1:
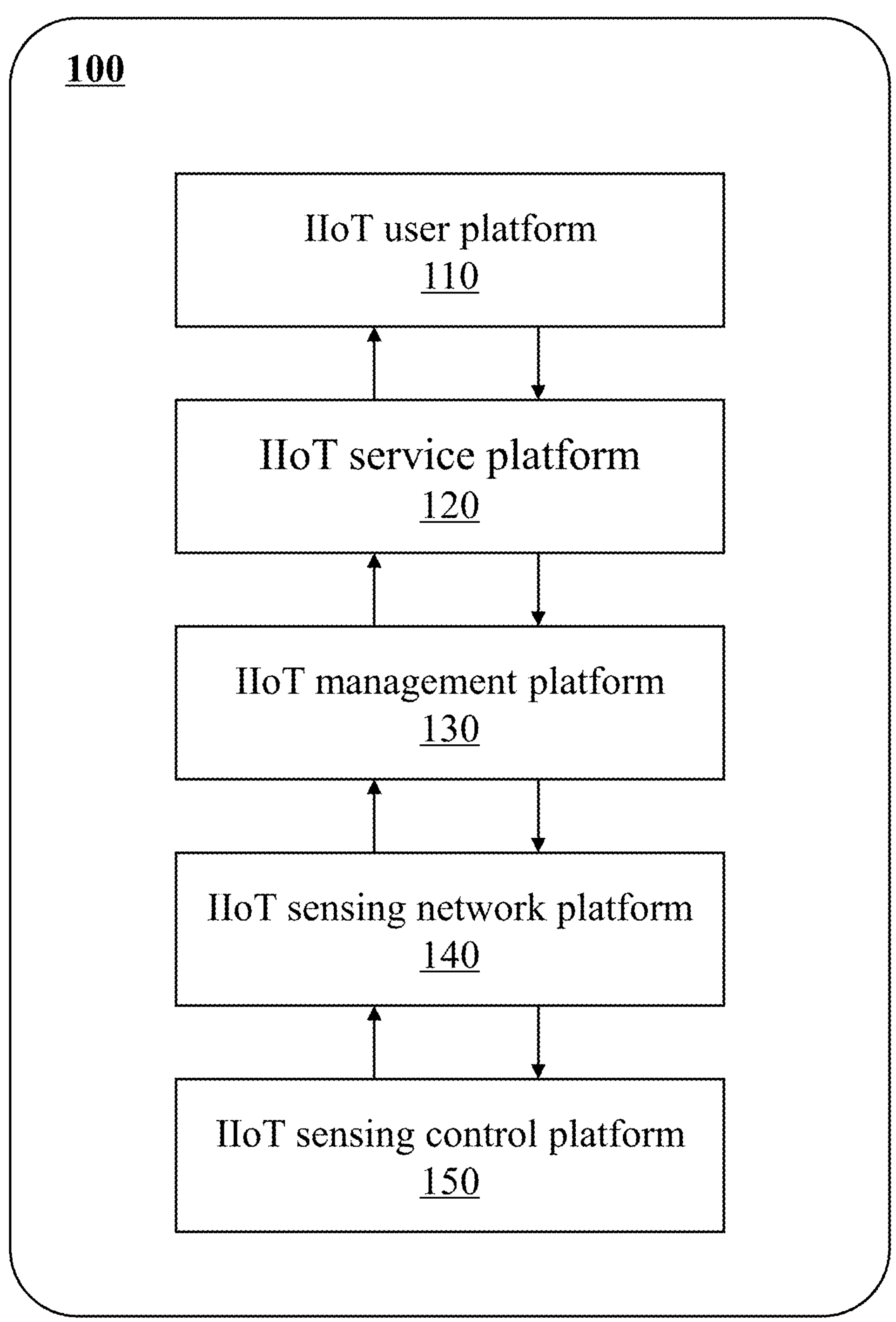
FIG. 1 is a schematic diagram illustrating a platform structure of a system for dynamic computing resource allocation based on an IIoT data center according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are one method to distinguish different components, elements, parts, sections, or assemblies of different levels. However, the terms may be displaced by another expression if they achieve the same purpose.

As shown in this disclosure and the claims, the words "a," "one," and/or "the" do not refer specifically to the singular forms but may also include the plural forms as well, unless the context clearly indicates otherwise. Generally, the terms "including" and "comprising" suggest only the inclusion of clearly identified steps and elements, and do not constitute an exclusive list, and the method or apparatus may also include other steps or elements.

Flowcharts are used in this disclosure to illustrate operations performed by a system according to embodiments of this disclosure. It should be appreciated that the preceding or following operations are not necessarily performed in an exact sequence. Instead, steps can be processed in reverse order or simultaneously. Also, it is possible to add other operations to these processes or remove a step or steps from them.

Due to the existence of different business types and different business volumes of enterprise users and different businesses (such as data statistics, data screening, data analysis, data storage, etc.) involving different types of data and processing demands, the occupied proportions of the resource of the IIoT system are different. Thus, there is a need for dynamic allocation of computing resource. Some embodiments of the present disclosure provide a system and method for dynamic computing resource allocation based on an IIoT data center, which can dynamically allocate resource for the processing of different business demands of enterprise users via the IIoT.

FIG. 1 is a schematic diagram illustrating a platform structure of a system for dynamic computing resource allocation based on an IIoT data center according to some embodiments of the present disclosure.

According to some embodiments of the present disclosure, as shown in FIG. 1, the system 100 for dynamic computing resource allocation based on an IIoT data center may include an IIoT user platform 110, an IIoT service platform 120, an IIoT management platform 130, an IIoT sensing network platform 140, and an IIoT sensing control platform 150.

The IIoT user platform 110 is a platform for interacting with an enterprise user. In some embodiments, the IIoT user platform 110 is configured to receive a business demand from the enterprise user and send the business demand to the IIoT service platform 120.

In some embodiments, the IIoT user platform 110 is a platform based on a desktop computer, a tablet, a laptop, a cellular phone, or other electronic devices capable of data processing and data communication.

The IIoT service platform 120 is a platform for processing a received business demand. In some embodiments, the IIoT service platform 120 is implemented based on a terminal, a server, or the like. In some embodiments, the IIoT service platform 120 is configured to process the business demand and then send the business demand to the data computing center of the IIoT management platform 130.

In some embodiments, the IIoT service platform 120 may interact with the IIoT management platform 130 in both directions. For example, after the IIoT management platform 130 calculates the resource allocation parameter based on the business demand and a resource demand feature, the IIoT management platform 130 may upload a resource allocation result to the IIoT service platform 120, which is further uploaded to the enterprise user by the IIoT service platform 120.

The IIoT management platform 130 is a platform for managing and controlling the system 100 for dynamic computing resource allocation based on the IIoT data center. In some embodiments, the IIoT management platform 130 may be implemented based on a processor, a server, or the like.

In some embodiments, the IIoT management platform 130 may include a data computing center, a business management sub-platform, and a control center (not shown in the figures).

The data computing center may be used to manage resources and process data and/or information from at least one of its own components or from an external data source (e.g., a cloud data center). In some embodiments, the data computing center is configured with a single server or a group of servers, which may be centralized or distributed.

The business management sub-platform is a hardware device used to perform a computing task in the system 100 for dynamic computing resource allocation based on the IIoT data center. In some embodiments, the business management sub-platform includes a monitoring module, and the monitoring module is configured to monitor resource data of the business management sub-platform. For example, the monitoring module includes a server monitoring hardware, a resource management software (e.g., Nagios, Zabbix, etc.), a performance counter, or the like.

The control center is a component for controlling a target computing terminal to perform computing and processing of data. In some embodiments, the control center includes a server-dependent computing device. In some embodiments, the control center is configured to determine, based on the business demand, a resource demand feature of the enterprise user; determine, based on the resource demand feature and the resource data of the business management sub-platform, a resource allocation parameter, the resource allocation parameter including computing resource corresponding to the computing task.

In some embodiments, the control center is further configured to determine the resource demand feature of the enterprise user based on production status data and the business demand of the enterprise user.

In some embodiments, the control center is further configured to determine the resource demand feature of the enterprise user based on the production status data and the business demand of the enterprise user using a demand estimation model, and the demand estimation model is a machine learning model.

In some embodiments, the control center is further configured to determine candidate parameters; determine computing features corresponding to the candidate parameters based on the candidate parameters, the resource demand feature, and the resource data; and determine the resource allocation parameter based on the computing features.

In some embodiments, the control center is further configured to: determine, based on the candidate parameters, resource demand feature, and resource data, the computing features using a feature estimation model, the feature estimation model being a machine learning model; determine, based on weighted values of computing response rates, data congestion probabilities, and failure probabilities of the computing features, parameter evaluation values of the computing features; and determine, based on the parameter evaluation values of the computing features, the resource allocation parameter.

In some embodiments, the control center is further configured to generate, based on the resource allocation parameter, a resource allocation instruction, the resource allocation instruction being configured to create a process corresponding to the computing task; and bind the process corresponding to the computing task to a resource core corresponding to the computing task, and the resource core is determined based on the resource allocation parameter.

In some embodiments, the IIoT management platform 130 interacts with the IIoT sensing network platform 140. For example, the IIoT management platform 130 sends data collection instructions to the IIoT sensing network platform 140.

The IIoT sensing network platform 140 is a network for data transmission in the system 100 for dynamic computing resource allocation based on the IIoT data center. In some embodiments, the IIoT sensing network platform 140 is configured with a communication device, a server, or the like.

In some embodiments, the IIoT sensing network platform 140 interacts with the IIoT sensing control platform 150. For example, the IIoT sensing network platform 140 receives data related to a production line collected by the IIoT sensing control platform 150 and transmits the data to the IIoT management platform 130 which further processes and analyzes the data.

The IIoT sensing control platform 150 is a platform used for monitoring and controlling the execution of production processes.

In some embodiments, the IIoT sensing control platform 150 includes a production monitoring device. The production monitoring device is a device for monitoring a production line. For example, the production monitoring device includes a current sensor, a temperature sensor, a gas metering device, or the like. In some embodiments, the production monitoring device is deployed in the enterprise user and is configured to obtain the production status data of the enterprise user.

Figure 2:
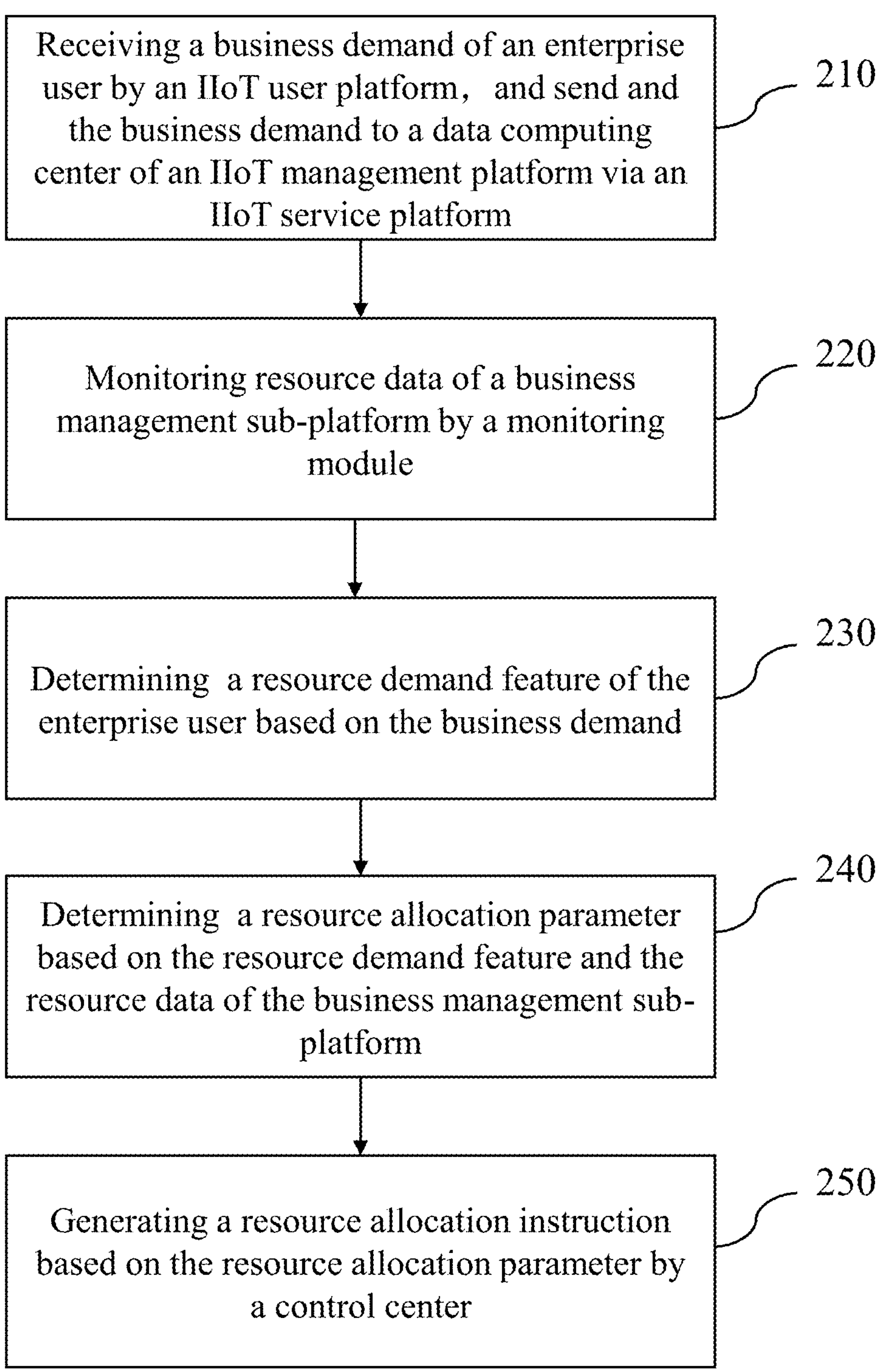
FIG. 2 is an exemplary flowchart illustrating a method for dynamic computing resource allocation based on an IIoT data center according to some embodiments of the present disclosure.
Figure 3:
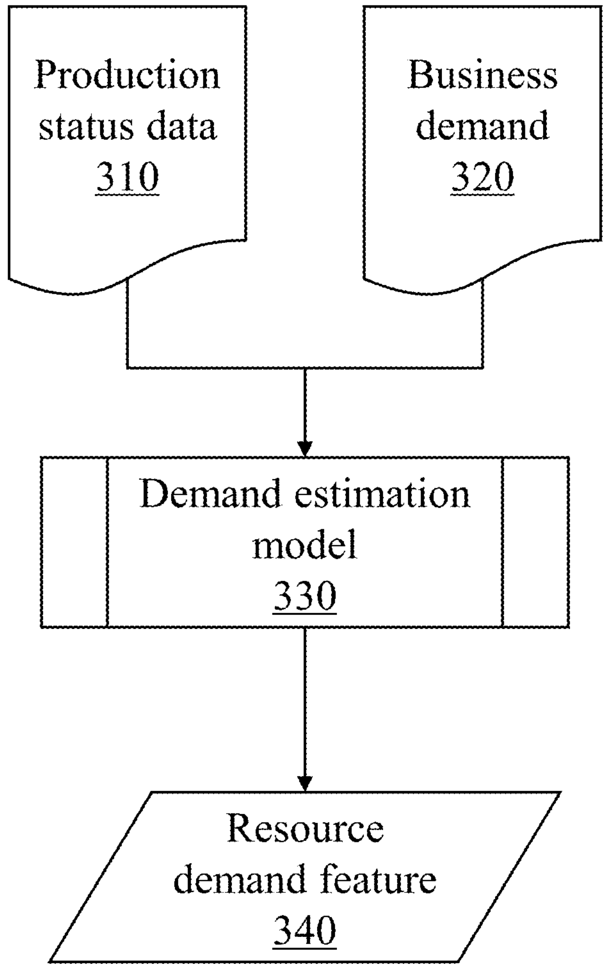
FIG. 3 is an exemplary schematic diagram illustrating a demand estimation model according to some embodiments of the present disclosure.
Figure 4:
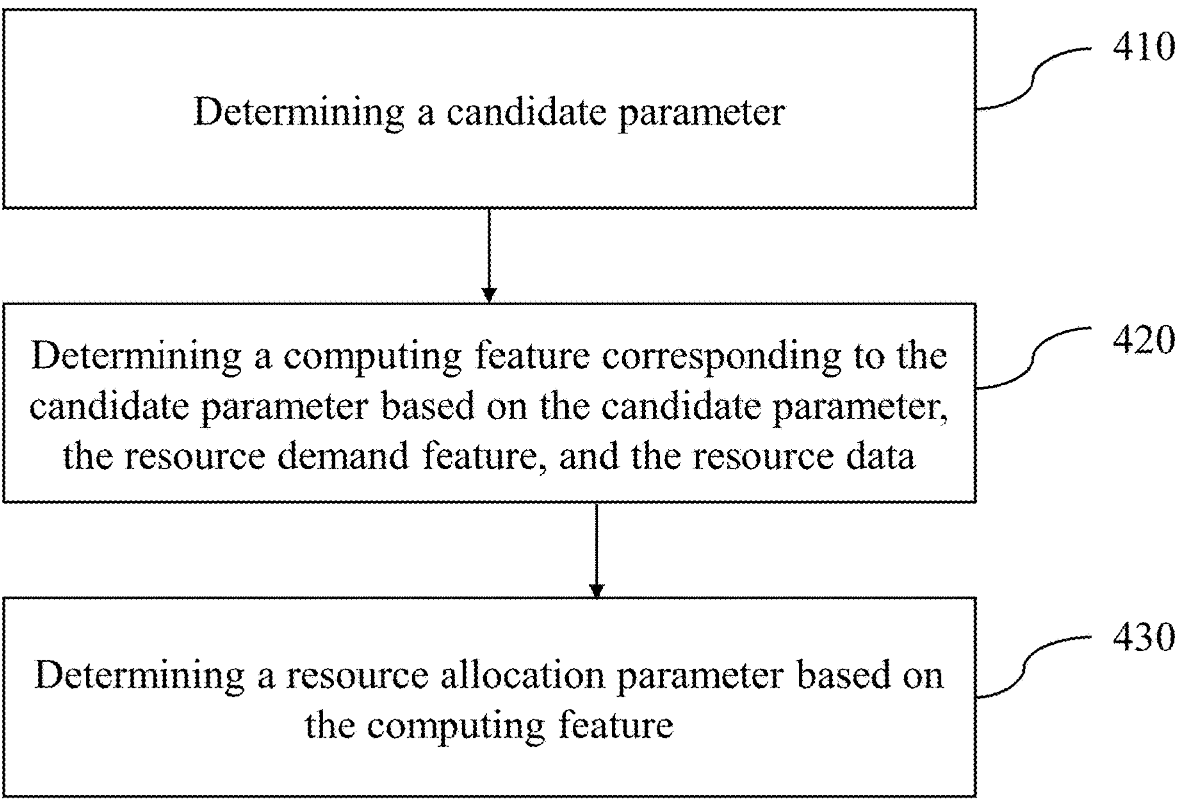
FIG. 4 is an exemplary flowchart illustrating a process for determining a resource allocation parameter according to some embodiments of the present disclosure.

More descriptions of the above section can be found elsewhere in the present disclosure, e.g., FIGS. 2-4.

In some embodiments of the present disclosure, the system 100 for dynamic computing resource allocation based on the IIoT data center can form a closed loop of information operation between the IIoT user platform and the IIoT sensing control platform, and can be coordinated and regularly operated under the unified management of the IIoT management platform, realizing informationization and intellectualization of the computing resource management; at the same time, the IIoT management platform allocates computing resources to different computing tasks according to different businesses of the enterprise users, improving the overall data quality to improve the service quality.

It should be noted that the above description of the system 100 for dynamic computing resource allocation based on the IIoT data center is only for descriptive convenience, and does not limit this disclosure to the scope of the embodiments. It is to be understood that, for a person skilled in the art, with an understanding of the principle of the system, it is possible to, without departing from this principle, make any combination of the various platforms of the system or constitute a sub-system to connect with other platforms.

FIG. 2 is an exemplary flowchart illustrating a method for dynamic computing resource allocation based on an IIoT data center according to some embodiments of the present disclosure. As shown in FIG. 2, a process 200 includes the following operations. In some embodiments, the process 200 is performed by a control center.

In 210, a business demand of an enterprise user is received by the IIoT user platform 110, and the business demand is sent to a data computing center of the IIoT management platform 130 via the IIoT service platform 120.

The enterprise user is an organization that needs to use the computing resource of the business management sub-platform for data processing. The business management sub-platform includes a plurality of devices that process the data, for example, a plurality of CPUs and/or GPUs are included in the business management sub-platform. The computing resource refers to the computing resource of the business management sub-platform. More descriptions regarding the business management sub-platform can be found in the corresponding description of FIG. 1, and more descriptions regarding the computing resource can be found in the later description.

The business demand is user demand data related to business calculation and/or business processing. For example, the business demand includes a business type, an upload time, a business volume, or the like. The business volume refers to the amount of the computing resource that the current business needs to use.

In some embodiments, the enterprise user inputs the business demand via the IIoT user platform 110, and the IIoT user platform 110 receives the business demand of the enterprise user and then sends the business demand to the IIoT service platform 120 for processing, and further sends it to a data computing center of the IIoT management platform 130.

In 220, resource data of the business management sub-platform is monitored by a monitoring module.

The monitoring module may access resource data from the business management sub-platform in a variety of ways. For example, when the monitoring module is resource management software, it remotely monitors the performance indicators of the business management sub-platform via network protocols (such as SNMP); and for example, when the monitoring module is a performance counter, the performance counter provides real-time data of system resources (such as CPU, memory, disk I/O, network traffic, etc.), and application programs, and the control center obtains the resource data of the business management sub-platform based on the aforementioned real-time data.

The resource data are data related to the computing resource of the business management sub-platform. For example, the resource data includes CPUs and/or GPUs that have been occupied by the business management sub-platform, the occupiable time of at least one CPU and/or GPU, or the like.

In 230, a resource demand feature of the enterprise user is determined based on the business demand.

The resource demand feature is data related to the resource that needs to be occupied to perform an operation. For example, the resource demand feature includes average resource demand or the like. The average resource demand is average data of the resource that needs to be occupied to perform the same operation, such as the average number of CPUs and/or GPUs occupied, the average time of individual CPUs and/or GPUs occupied, or the like.

In some embodiments, the control center determines the resource demand feature of the enterprise user based on the business demand in a variety of ways. For example, the control center, in accordance with the business demand of the enterprise user, queries all computing processes in the history of the computation of the business demand of the type, and statistically determines the average resource demand of all the aforementioned computing processes as the corresponding resource demand feature.

In some embodiments, the resource demand feature also includes a peak feature, and the control center also determines the resource demand feature of the enterprise user based on production status data and the business demand of the enterprise user.

The peak feature refers to a maximum amount of computing resource occupied by performing a business, such as a maximum number of CPUs and/or GPUs occupied, a maximum duration of CPU and/or GPU occupied, or the like.

The production status data refers to data that characterizes features related to the production process. For example, the production status data includes the current production output, the number of production lines in operation, the production quality of the enterprise user, or the like.

In some embodiments, the production status data is obtained by a production monitoring device deployed in the enterprise user.

Only as an example, when the production monitoring device is a current sensor, the current sensor monitors the current change in the production line, and the control center determines the production quality in the production process based on the current change. For example, current fluctuations in a welding device reflect welding quality. More descriptions regarding the production monitoring device can be found elsewhere in the present disclosure, e.g., FIG. 1.

In some embodiments, the control center determines the resource demand feature of the enterprise user in various ways based on the production status data and the business demand of the enterprise user. For example, the control center, in accordance with a type of the current business demand and the production status data of the enterprise user, queries all calculation processes in the history of the computation of the business demand of the type, statistically determines the respective peak feature and average resource demand of all the above calculation processes, sorts the peak features, and selects a largest peak feature and largest average resource demand as the corresponding resource demand feature.

In some embodiments, the control center also determines the resource demand feature of the enterprise user based on the production status data and the business demand of the enterprise user using a demand estimation model. More descriptions regarding this section can be found elsewhere in the present disclosure, e.g., FIG. 3.

In some embodiments, by considering the peak feature, it is possible to accurately control the number and the time of CPUs and/or GPUs that need to be occupied by the computation of the current business demand and to reduce the unnecessary waste of resource.

In 240, a resource allocation parameter is determined based on the resource demand feature and the resource data of the business management sub-platform.

The resource allocation parameter is data related to the computing resource of the business management sub-platform that is allocated for at least one computing task.

The computing task is a specific operation that needs to be performed in the business management sub-platform, usually referring to data processing, calculations, and analysis. The type of the computing task is related to a type corresponding to the enterprise user, and take the computing task corresponding to the gas enterprise as an example, the computing task includes calculating the gas reserve and transmission volume for the future time period based on the data that has already been acquired.

In some embodiments, the resource allocation parameter includes computing resource allocated corresponding to the computing task, e.g., CPU and/or GPU resource allocated, including the number and occupancy time period of CPUs and/or GPUs, or the like.

In some embodiments, the control center determines the resource allocation parameter based on the resource demand feature and the resource data of the business management sub-platforms in various ways. For example, the control center determines the resource allocation parameter using linear programming.

Exemplarily, the objective function of linear programming is shown in equations (1) and (2) below:

$$MinimizeZ_1 = \max\left(\sum_i t_i \cdot x_{ij}\right) \forall\ j \tag{1}$$

$$MinimizeZ_3 = \sum_j \left| \sum_i t_i \cdot x_{ij} - \frac{1}{n} \sum_i \sum_j t_i \cdot x_{ij} \right| \tag{2}$$

where $\text{Minimize}Z_1$ denotes a minimization of a maximum completion time, which is the objective function used to improve the computing response rate of all computing tasks; $x_{ij}$ denotes whether the computing task (i) is assigned to CPU (j) or GPU (j), and the value of $x_{ij}$ is 0 or 1, when $x_{ij}$ is 1, it means that the computing task (i) is assigned to, and vice versa; CPU (j) or GPU (j) denotes a corresponding coding representation of the CPU and GPU after the coding region division, i.e., CPU in the jth coding region, GPU in the jth coding region; $t_i$ denotes an execution time of the computing task (i) (i.e., the average resource demand of the business type corresponding to the business demand i of the enterprise user in the resource demand feature); $\text{Minimize}Z_3$ denotes maximizing the region utilization rate or the load balance, i.e., under the condition of balanced distribution of the computing task among CPU or GPU, the minimal time difference in task loads among the CPU or GPU.

A constraint corresponding to the objective function includes that each computing task must be assigned to at least one coding region and that each coding region must not be loaded beyond its available time. An equation for the constraint is expressed as shown in equations (3) and (4) below, where the available time for each coding region is determined based on the obtained resource data of the business management sub-platform:

$$\sum_j x_{ij} \geq 1 \ \forall i \quad (3)$$

$$\sum_i t_i \cdot x_{ij} \leq c_j \ \forall j \quad (4)$$

In some embodiments, solving for the objective function is accomplished by various methods, such as Pareto optimization, ¿-constraints, or the like.

In some embodiments, the control center determines the resource allocation parameter based on the computing features. More descriptions regarding this section can be found elsewhere in the present disclosure, e.g., FIG. 4.

In 250, a resource allocation instruction is generated based on the resource allocation parameter by the control center.

The resource allocation instruction is a policy and mechanism by which resource is allocated.

In some embodiments, the resource allocation instruction is configured to: create a process corresponding to the computing task based on the resource allocation parameter; and bind the process corresponding to the computing task to a resource core corresponding to the computing task, the resource core being determined based on the resource allocation parameter.

The resource core, i.e., a CPU core or a GPU core, is a basic processing unit of the CPU or GPU. Each CPU core or GPU core is capable of independently executing computing tasks such as reading instructions, processing data, and executing programs.

In some embodiments of the present disclosure, dynamically allocating computing resource based on the IIoT can effectively improve the efficiency of business processing and further enhance the utilization of resource.

FIG. 3 is an exemplary schematic diagram illustrating a demand estimation model according to some embodiments of the present disclosure.

In some embodiments, the control center determines a resource demand feature 340 of an enterprise user based on production status data 310 and a business demand 320 of the enterprise user using a demand estimation model 330.

The demand estimation model is a model used to determine the resource demand feature. In some embodiments, the demand estimation model is a machine learning model, such as Recurrent Neural Network (RNN) models, or other trained machine learning models.

In some embodiments, an input of the demand estimation model includes the production status data and the business demand of the enterprise user, and an output of the demand estimation model includes the resource demand feature of the enterprise user.

In some embodiments, the demand estimation model is obtained by various methods. For example, the demand estimation model is obtained by training based on a plurality of training samples with labels via gradient descent or other feasible means.

In some embodiments, the training samples and corresponding labels are determined based on historical data. The training samples may be obtained based on historical data that meets expectations. The training samples may include production status data and a business demand of at least one historical enterprise user in a first historical time period in the historical data that meets the expectations, and the label may be a historical resource demand feature actually occupied by the corresponding historical enterprise user at a second historical time period. The historical data that meets the expectations may be that the computing resource allocated for the historical enterprise user meets a computing need, the load of the business management sub-platform is not overloaded, and the computing efficiency of the entire business management sub-platform is not lower than a preset threshold. Both the first historical time period and the second historical time period are a time period in the past, and the first historical time period is earlier than the second historical time period.

Only as an example, the control center inputs the training samples into an initial demand estimation model to obtain an output of the initial demand estimation model; a loss function is constructed based on the output of the initial demand estimation model and the labels corresponding to the training samples; the parameters of the initial demand estimation model are iteratively updated based on the loss function; a trained demand estimation model is obtained until an end condition of the iteration is met and the training is completed. The end condition of the iteration includes the convergence of the loss function, the number of the iteration reaching a threshold, or the like.

In some embodiments, the demand estimation model is obtained based on training of a training dataset that includes a plurality of training samples. The training dataset includes a training set and a testing set.

The training set refers to a dataset used to train the demand estimation model.

The testing set is a dataset used to evaluate the demand estimation model after the training is completed.

In some embodiments, the training set and the testing set are determined based on a business type. Exemplarily, the control center divides the business demands corresponding to the enterprise users and their associated production status data into a plurality of databases according to the business type, and randomly extracts a preset ratio of samples from each of the plurality of databases to the testing set or the training set. The preset ratio refers to a preset ratio of samples drawn from the databases to form the testing set to samples drawn from the databases to form the training set. For example, the preset ratio is 3:7, such that if the samples drawn are used to form the training set, the ratio of samples drawn in the database is 0.7. The preset ratio may be based on an empirical preset or a system default setting.

In some embodiments, among the plurality of training samples, different training samples have different learning rates, and the learning rates of the training samples correlate to computing features corresponding to the training samples.

The learning rate is data used to control a pace size of updating a weight of the model when training the demand estimation model.

The computing feature refer to a feature related to the processing of a training sample by the business management sub-platform. For example, the computing feature include a computing response rate or the like. The computing response rate may be determined based on the time required for the business management sub-platform to complete the corresponding computing task, and the longer the time required, the smaller the computing response rate.

In some embodiments, the control center determines, based on historical computing data of the business management sub-platform, the computing response rate of the business management sub-platform in processing various types of business demands, and determines an average computing response rate corresponding to each type of business demand as computing feature of the type of business demand, and then determines the computing feature corresponding to the training samples based on the type of business demand corresponding to the training samples.

In some embodiments, a learning rate corresponding to the training sample is positively correlated with its corresponding computing feature.

In some embodiments of the present disclosure, the model is trained and tested using a training dataset, which can improve the accuracy of the obtained model; the computing response rate is also considered when training the model, which further takes into account the impact of the quality of the samples to the model; the faster the computing response rate, the better the quality of the training sample, and in order to learn the implied laws of such samples, the learning rate can be increased, thereby making the model ultimately obtained more in line with the actual laws.

In some embodiments of the present disclosure, the machine learning model allows for a more accurate estimation of the resource needed for the current computation, facilitating subsequent resource allocation to improve allocation efficiency.

FIG. 4 is an exemplary flowchart illustrating a process for determining a resource allocation parameter according to some embodiments of the present disclosure.

In some embodiments, the control center is further configured to: determine candidate parameters; determine computing features corresponding to the candidate parameters based on the candidate parameters, the resource demand feature, and the resource data; and determine a resource allocation parameter based on the computing features.

In some embodiments, as shown in FIG. 4, a process 400 includes the following operations. The process 400 may be performed by the control center.

In 410, candidate parameters are determined.

The candidate parameters are data used as an alternative resource allocation parameter.

In some embodiments, the resource allocation parameter further includes a bandwidth regulation amount for a network device where a communication channel of a computing task is located.

The communication channel is a medium or path for transmitting information, such as a channel for obtaining the business demand corresponding to the computing task or a channel for transmitting a computing result of the computing task. A plurality of communication channels may be included in the business management sub-platform, and different computing tasks may transmit data based on different communication channels.

The bandwidth regulation amount refers to the ability or mechanism to adjust the data transmission rate in network communications. The bandwidth regulation amount may include a target bandwidth amount to be adjusted to, or the like. For example, by increasing the bandwidth of a network device where the communication channel is located, the data transmission rate of the communication channel is accelerated, which in turn is conducive to enhancing the execution efficiency of the computing task corresponding to the communication channel.

In some embodiments, the control center determines the candidate parameters in various ways. For example, the control center counts the number of times each resource allocation parameter has been used in the historical data and selects the top N resource allocation parameters that have been used the most among them as candidate parameters. The value of N may be preset as desired. For another example, the control center randomly generates a plurality of resource allocation parameters as candidate parameters.

In 420, computing features corresponding to the candidate parameters are determined based on the candidate parameters, the resource demand feature, and the resource data.

In some embodiments, the control center determines, based on the candidate parameters, the resource demand feature, and the resource data, the computing features corresponding to the candidate parameters in various ways. For example, the control center determines the computing features corresponding to the candidate parameters by means of vector matching.

Exemplarily, the control center constructs a vector database based on the historical data. The vector database may include at least one reference vector and its corresponding label.

The control center may construct at least one clustering vector based on a historical resource allocation parameter executed in the historical data, as well as a historical resource demand feature and historical resource data corresponding to the historical resource allocation parameter; cluster the at least one clustering vector, forming a preset number of clustering centers; construct at least one reference vector based on the historical candidate parameter, the historical resource demand feature, and the historical resource data corresponding to the clustering centers; and use the respective historical computing feature corresponding to each of the clustering centers as a label for its corresponding reference vector. The preset number may be preset based on the demand. The clustering algorithms may be various, such as K-mean clustering, hierarchical clustering, or the like.

In some embodiments, the control center constructs a feature vector based on the candidate parameter, the resource demand feature, and the resource data, matches the feature vector in the vector database based on the feature vector, determines a reference vector having the highest degree of similarity to the feature vector, and designates a label of the reference vector as the computing feature corresponding to the candidate parameter. The degree of similarity may be determined based on a vector distance, and the smaller the vector distance, the higher the degree of similarity.

In some embodiments, the control center is further configured to: determine computing features based on the candidate parameters, the resource demand feature, and the resource data using a feature estimation model.

In some embodiments, each computing feature further includes a data congestion probability and a failure probability.

The data congestion probability refers to a probability that a business demand will have to wait for the CPU and/or GPU resources to be freed up before being used.

The failure probability refers to a probability that an incident occurs during the computing process that causes a business demand to not be executed properly. For example, the failure probability includes a probability of problems such as hangs, out of memory, and long network transmission time occurring during the computing process. The hang is a state in which a process, program, or system temporarily stops executing or is unable to continue to function normally.

The feature estimation model is a model used to determine the computing feature. In some embodiments, the feature estimation model is a machine learning model, such as a Neural Network (NN) model or other trained machine learning models.

In some embodiments, an input of the feature estimation model includes the candidate parameter, the resource demand feature, and the resource data, and an output of the feature estimation model includes the computing feature.

In some embodiments, the feature estimation model is obtained by various methods. For example, the feature estimation model is obtained by training based on a plurality of second training samples with second labels via gradient descent or other feasible means.

In some embodiments, the second training sample and its corresponding second label are determined based on the historical data. The second training sample may include a historical resource allocation parameter actually executed in the historical data, a corresponding historical resource demand feature of at least one historical enterprise user, and historical resource data of a historical business management sub-platform, and the second label may include a historical computing feature corresponding to the historical resource allocation parameter actually executed in the historical data. For example, for the computing response rate, the data congestion probability, and the failure probability when the historical resource allocation parameter is actually executed, the data congestion probability is 1 if data congestion occurs, and the data congestion probability is 0 if data congestion does not occur, and the determination of the failure probability is the same.

The feature estimation model is trained in a similar way to the demand estimation model, more descriptions can be found in above of the present disclosure.

In 430, a resource allocation parameter is determined based on the computing features.

In some embodiments, the control center determines a resource allocation parameter based on the computing features in various ways. For example, the control center counts a plurality of computing features and selects a candidate parameter corresponding to a computing feature of which the computing response rate is greater than a preset rate threshold, and the data congestion probability and the failure probability are lower than a preset probability threshold, as a final resource allocation parameter. The preset rate threshold is a preset maximum value of the computing response rate, and the preset probability threshold is the preset minimum value of the data congestion probability and the failure probability. The preset rate threshold and the preset probability threshold may be preset based on experience or set by default of the system.

In some embodiments, the control center determines parameter evaluation values of the computing features based on weighted values of the computing response rates, the data congestion probabilities, and the failure probabilities of the computing features, and determines a resource allocation parameter based on the parameter evaluation values of the computing features.

The parameter evaluation value characterizes an evaluation result of the comprehensive performance of the resource allocation parameter, and the larger the parameter evaluation value, the more the resource allocation parameter should be prioritized for application. For example, the control center designates a candidate parameter corresponding to the computing feature with the largest parameter evaluation value as the resource allocation parameter.

In some embodiments, the control center, in various ways, obtains the weighted value of the computing response rate, the data congestion probability, and the failure probability of the computing feature. For example, the control center obtains the weighted value via a preset equation. Exemplarily, the preset equation is shown in an equation (5) below:

$$W = k_1/v + k_2/p_d + k_3/p_f \tag{5}$$

where W denotes a weighted value, v denotes a computing response rate, $p_d$ denotes a data congestion probability, $p_f$ denotes a failure probability, $k_1$, $k_2$, $k_3$ are preset coefficients. $k_1$, $k_2$, and $k_3$ may be preset based on experience.

In some embodiments, the weighted value of the computing response rate, the data congestion probability, and the failure probability of the computing feature are related to the resource demand feature of the enterprise user, i.e., $k_1$, $k_2$, $k_3$ are determined based on the resource demand feature of the enterprise user.

In some embodiments, the greater the average resource demand in the resource demand feature of the enterprise user, the smaller $k_1$; the greater the difference between the corresponding total data amount of the business demand of the enterprise user and the available computing resource of the business management sub-platform, the smaller $k_2$; and the larger the total data amount of the business demand of the enterprise user, the smaller $k_3$.

In some embodiments of the present disclosure, by correlating the respective weights with the resource demand feature of the enterprise user, the weighted value obtained can be made more accurate, which in turn makes the resource allocation parameter determined subsequently more in line with the actual situation.

In some embodiments of the present disclosure, using a machine learning model, the computing response rate, the data congestion probability, and the failure probability are estimated, which can ensure the accuracy of the obtained computing feature and reduce the time wasted in the estimation process; determine the parameter evaluation value based on the weighted value of the computing feature, and then determine the resource allocation parameter, which is conducive to finding the optimal program, thereby effectively improving the actual service effect.

In some embodiments, the resource allocation instruction is configured to: obtain communication information of the computing task; determine a communication channel of the computing task based on the communication information; adjust, based on a bandwidth regulation amount corresponding to the communication channel in the resource allocation parameter, the bandwidth allocation strategy of the network device where the communication channel of the computing task is located to adjust the bandwidth of the communication channel of the computing task.

The communication information refers to data related to communication of the business demand in the computing task. In some embodiments, the communication information includes at least one of a communication source address, a communication destination address, and a communication relay address corresponding to the computing task.

The communication source address is an address in the network of the device or node that sends the message, such as the address in the network of the device or node that sends the business demand.

The communication destination address is an address of the target device or node to which the message is to be sent, such as the address of the target device or node to which the computing result is to be sent.

The communication relay address is an address of an intermediate device or node that may pass through during the transmission of data from the source address to the destination address.

In some embodiments, at the time the process is created, the control center accesses the communication information directly based on the business demand.

In some embodiments, the control center determines a communication channel for each computing task by querying a routing table on the network device based on the communication source address, the communication destination address, and the communication relay address of each computing task. The network device is an electronic device for connecting and managing computers and other devices in a network for data transmission, communication, and network services. The routing table is a data structure used to store path information on a network device. The routing table records the destination address for data transmission, the address of the next network device, and so on. The routing table may be set up manually by a staff member, or updated automatically by a dynamic routing protocol. The dynamic routing protocol is a mechanism used to automatically discover and maintain routing information in computer networks.

The bandwidth allocation strategy is a process and rule for allocating available bandwidth to different users, devices, or applications in a network. For example, the bandwidth allocation strategy includes a bandwidth allocation amount to the network devices where the individual communication channels are located, the priority of allocation, or the like. The bandwidth allocation strategy may be determined in any feasible manner.

In some embodiments, the control center, based on the corresponding bandwidth regulation amount of the communication channel of each task in the resource allocation parameter, adjusts a bandwidth allocation strategy of the network device where the communication channel of each task is located to adjust a bandwidth of the communication channel of each task, for example, by increasing the corresponding bandwidth allocation amount in the bandwidth allocation strategy of the network device where the communication channel is located to the corresponding bandwidth regulation amount in the resource allocation parameter.

In some embodiments of the present disclosure, by generating a plurality of candidate parameters and determining an optimal solution therefrom by evaluating the actual computing feature of each of the candidate parameters, the actual service effect can be effectively improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for dynamic computing resource allocation based on an Industrial Internet of Things (IIoT) data center, wherein the system comprises an IIoT user platform, an IIoT service platform, an IIoT management platform, an IIoT sensing network platform, and an IIoT sensing control platform;

the IIoT user platform being configured to receive a business demand from an enterprise user and send the business demand to a data computing center of the IIoT management platform via the IIoT service platform;

the IIoT management platform comprising the data computing center, a business management sub-platform, and a control center, the business management sub-platform comprising a monitoring module, the monitoring module being configured to monitor resource data of the business management sub-platform;

the control center being configured to:

determine a resource demand feature of the enterprise user based on the business demand; and determine a resource allocation parameter based on the resource demand feature and the resource data of the business management sub-platform, the resource allocation parameter including computing resources corresponding to a computing task; and the control center being further configured to generate a resource allocation instruction based on the resource allocation parameter, the resource allocation instruction being configured to:

create a process corresponding to the computing task; and bind the process corresponding to the computing task to a resource core corresponding to the computing task, the resource core being determined based on the resource allocation parameter, wherein the resource allocation parameter further includes a bandwidth regulation amount of a network device where a communication channel of the computing task is located;

the control center is further configured to:

determine candidate parameters;

determine computing features corresponding to the candidate parameters based on the candidate parameters, the resource demand feature, and the resource data; and determine the resource allocation parameter based on the computing features; and the resource allocation instruction is configured to:

obtain communication information for the computing task, the communication information comprising at least one of a communication source address, a communication destination address, and a communication relay address;

determine the communication channel of the computing task based on the communication information; and adjust, based on the bandwidth regulation amount corresponding to the communication channel in the resource allocation parameter, a bandwidth allocation strategy of the network device where the communication channel of the computing task is located to adjust a bandwidth of the communication channel of the computing task.

2. The system according to claim 1, wherein the IIoT sensing control platform further includes a production monitoring device, the production monitoring device being deployed in the enterprise user, the production monitoring device being configured to obtain production status data of the enterprise user; wherein the resource demand feature further includes a peak feature; and the control center is further configured to:

determine the resource demand feature of the enterprise user based on the production status data and the business demand of the enterprise user.

3. The system according to claim 2, wherein the control center is further configured to determine, based on the production status data of the enterprise user and the business demand, the resource demand feature of the enterprise user using a demand estimation model, the demand estimation model being a machine learning model.

4. The system according to claim 1, wherein each of the computing features includes a computing response rate, a data congestion probability, and a failure probability; and the control center is further configured to:

determine the computing features by a feature estimation model based on the candidate parameters, the resource demand feature, and the resource data, the feature estimation model being a machine learning model;

determine parameter evaluation values of the computing features based on weighted values of the computing response rates, the data congestion probabilities, and the failure probabilities of the computing features; and determine the resource allocation parameter based on the parameter evaluation values of the computing features.

5. A method for dynamic computing resource allocation based on an IIoT data center, wherein the method is executed by a control center of an IIoT management platform of a system for dynamic computing resource allocation based on an IIoT data center, the system including an IIoT user platform, an IIoT service platform, the IIoT management platform, an IIoT sensing network platform, and an IIoT sensing control platform;

the IIoT management platform including a data computing center, a business management sub-platform, and the control center, the business management sub-platform including a monitoring module;

the method comprising:

receiving a business demand from an enterprise user through the IIoT user platform and sending the business demand to the data computing center of the IIoT management platform via the IIoT service platform;

monitoring resource data of the business management sub-platform via the monitoring module;

determining a resource demand feature of the enterprise user based on the business demand;

determining a resource allocation parameter based on the resource demand feature and the resource data of the business management sub-platform, the resource allocation parameter including computing resources corresponding to a computing task; and generating, by the control center, a resource allocation instruction based on the resource allocation parameter, the resource allocation instruction being configured to:

create a process corresponding to the computing task; and bind the process corresponding to the computing task to a resource core corresponding to the computing task, the resource core being determined based on the resource allocation parameter, wherein the resource allocation parameter further includes a bandwidth regulation amount of a network device where a communication channel of the computing task is located, the determining the resource allocation parameter based on the resource demand feature and the resource data of the business management sub-platform includes:

determining candidate parameters:

determining computing features corresponding to the candidate parameters based on the candidate parameters, the resource demand feature, and the resource data; and determining the resource allocation parameter based on the computing features; and the resource allocation instruction is configured to:

obtain communication information of the computing task, the communication information including at least one of a communication source address, a communication destination address, and a communication relay address;

determine the communication channel of the computing task based on the communication information; and adjust, based on the bandwidth regulation amount corresponding to the communication channel in the resource allocation parameter, a bandwidth allocation strategy of the network device where the communication channel of the computing task is located to adjust a bandwidth of the communication channel of the computing task.

6. The method according to claim 5, wherein the resource demand feature further includes a peak feature, the determining a resource demand feature of the enterprise user based on the business demand, including:

determining the resource demand feature of the enterprise user based on the production status data of the enterprise user and the business demand, wherein the production status data is obtained by a production monitoring device deployed in the enterprise user.

7. The method according to claim 6, wherein the determining the resource demand feature of the enterprise user based on the production status data of the enterprise user and the business demand includes:

determining, based on the production status data of the enterprise user and the business demand, the resource demand feature of the enterprise user using a demand estimation model, the demand estimation model being a machine learning model.

8. The method according to claim 5, wherein each of the computing features includes a computing response rate, a data congestion probability, and a failure probability;

the determining the resource allocation parameter based on the computing features includes:

determining the computing features by a feature estimation model based on the candidate parameters, the resource demand feature, and the resource data, the feature estimation model being a machine learning model;

determining parameter evaluation values of the computing features based on weighted values of the computing response rates, the data congestion probabilities, and the failure probabilities of the computing features; and determining the resource allocation parameter based on the parameter evaluation values of the computing features.

* * * * *